United States Patent
Backer et al.

(10) Patent No.: US 8,188,207 B2
(45) Date of Patent: May 29, 2012

(54) PROCESS FOR PRODUCING HIGH STRENGTH POLYETHYLENE FILM

(75) Inventors: Jan Adolph Dam Backer, Son en Breugel (NL); Bart Clemens Kranz, Uden (NL); Benjamin Slager, Rhenen (NL)

(73) Assignee: Novameer B.V., Veghel (NL)

( * ) Notice: Subject to any disclaimer, the term of this patent is extended or adjusted under 35 U.S.C. 154(b) by 0 days.

(21) Appl. No.: 12/935,352

(22) PCT Filed: Apr. 21, 2009

(86) PCT No.: PCT/EP2009/054726
§ 371 (c)(1),
(2), (4) Date: Sep. 29, 2010

(87) PCT Pub. No.: WO2009/132990
PCT Pub. Date: Nov. 5, 2009

(65) Prior Publication Data
US 2011/0028671 A1    Feb. 3, 2011

(30) Foreign Application Priority Data
Apr. 29, 2008   (EP) .................................. 08155406

(51) Int. Cl.
*C08F 110/02* (2006.01)
*B29C 53/16* (2006.01)
(52) U.S. Cl. ..................... 526/352; 526/348.1; 264/164; 264/288.4; 264/290.5
(58) Field of Classification Search .............. 526/348.1, 526/352; 264/164, 288.4, 290.5
See application file for complete search history.

(56) References Cited

U.S. PATENT DOCUMENTS
4,769,433 A  *  9/1988  Chanzy et al. ............. 526/348.1
7,348,053 B1    3/2008  Weedon et al.

FOREIGN PATENT DOCUMENTS
EP         1 627 719 A1 *  2/2006
WO       WO 92/03494   *  3/1992
WO       WO 92/03494 A1   3/1992

OTHER PUBLICATIONS

Smith et al., "Drawing of virgin ultrahigh molecular weight polyethylene: an alternative route to high strength/high modulus materials" Journal of Materials Science, vol. 22, pp. 523-531 (1987).
Rotzinger et al. "High strength/high modulus polyethylene: synthesis and processing of ultra-high molecular weight virgin Powders" Polymer, vol. 30, No. 10, pp. 1814-1819 (1989).
International Search Report issued in corresponding International Application No. PCT/EP2009/054726, mailed Aug. 21, 2009.
Written Opinion of the International Searching Authority issued in corresponding International Application No. PCT/EP2009/054726, mailed Aug. 21, 2009.

* cited by examiner

*Primary Examiner* — Ling Choi
(74) *Attorney, Agent, or Firm* — Oliff & Berridge, PLC

(57) ABSTRACT

Process for producing high strength polyethylene films or tapes comprising the steps of: providing a quantity of disentangled polyethylene, applying a pressure of at least 20 bar to the quantity of disentangled polyethylene and a temperature between the α-relaxation temperature and the melting temperature of the disentangled polyethylene $T_{m\,PE}$ resulting in a block of disentangled polyethylene, skiving a film or tape off the block of disentangled polyethylene and, drawing said film or tape in a single or multi stage drawing step at a total draw ratio of at least 1:20.

4 Claims, No Drawings

PROCESS FOR PRODUCING HIGH STRENGTH POLYETHYLENE FILM

The present invention pertains a process for producing a high strength polyethylene film, filament or tape.

Currently high strength polyethylene film, filament or tape is produced from ultra high molecular weight polyethylene (UHMWPE) having a molecular weight in the range of 400000 g/mol up to several million g/mol.

Commercially available ultra high molecular weight polyethylene (UHMWPE) is very difficult to process into high strength film, filaments or tapes (e.g. from slitted film) without using solvent. The difficulty in processing is caused by entanglements in the very long crystal network.

For this reason, the ultra high molecular weight polyethylene (UHMWPE) is often dissolved in suitable solvents, like decalin and paraffin, in order to disentangle the network. But after being processed into a film, filament or tape the solvent has to be fully removed. This is very difficult and expensive, and a solvent content below 0.1% is nearly never achieved.

Some solvent-free developments or processing routes e.g. from Nippon Oil, ITS-Tensylon or DSM (see e.g. EP 1627719) use UHMWPE in the form of a powder, scattered onto a high pressure continuous isobar steel belt press to make a compacted film. This film can be drawn in different steps at an elevated temperature into a high strength film or tape.

The thickness and evenness of the scattered powder layer, the accurate pressure and temperature in the belt press are all key factors to achieve optimum results with regard to the strength and modulus of the resulting UHMWPE product.

On the other hand, a well known method for UHMWPE to be processed into films is skiving thin layers from sintered sheets or round blocks. These films are generally used for anti adhesive surfaces or highly abrasive resistant skins like ski- or snowboard gliding surfaces in a thickness between 0.10 mm and up to 4 mm. For those UHMWPE films there is no drawing or stretching needed. For these purposes the ultimate tensile strength and e-modulus are not the desired properties, merely the smoothness and abrasion resistance.

Due to the entangled crystal network of these films skived from UHMWPE blocks, drawing this skived film/sheet into high strength film is impossible. Draw ratios of λ 1:10 or higher cannot be achieved with UHMWPE having an entangled crystal network. However, high strength applications require draw ratios λ of the film in the range of 1:10 up to 1:100 or even 1:300.

The maximum possible draw ratio for a standard sintered powder of UHMWPE $\lambda_{max}$ is given in the following equation:

$$\lambda_{max} = K(M_e)^{1/2}$$

where $\lambda_{max}$ is the maximum draw ratio, K is the proportionality constant and $M_e$ is the molar mass between entanglements.

For entangled UHMWPE the maximum draw ratio is found to be below 10.

It is therefore an object of the present invention to provide a process for producing high strength polyethylene films, filaments or tapes in which the disadvantages of the prior art are at least reduced.

This object is achieved by a process for producing high strength polyethylene films or tapes comprising the steps of
providing a quantity of disentangled polyethylene,
applying a pressure of at least 20 bar to the quantity of disentangled polyethylene and a temperature between the α-relaxation temperature and the melting temperature of the disentangled polyethylene $T_{m\,PE}$ resulting in a block of disentangled polyethylene
skiving a film or tape off the block of disentangled polyethylene and
drawing said film or tape in a single or multi stage drawing step at a total draw ratio of at least 1:20.

A high strength polyethylene film or tape preferably exhibits a tensile strength of at least 1200 MPa and a tensile modulus of at least 40 GPa.

Preferably the polyethylene used in the process according to the invention has a molecular weight of at least 100.000 g/mol, more preferably 500.000 g/mol and most preferably at least 1.000.000 g/mol. The polyethylene may also be a mixture of polyethylenes of different molecular weight e.g. a bimodal polyethylene comprising two different molecular weight polyethylenes.

The quantity of disentangled polyethylene is preferably in the form of a powder.

Preferably the temperature of the process according to the invention is between α-relaxation temperature and $T_{mpE}-10°$ C., more preferably between 100° C. and 130° C.

Preferably the applied pressure is at least 50 bar, more preferably at least 100 bar, most preferably at least 200 bar or even 500 bar.

A block is a compacted volume of a powder in a regular shape e.g. a disc shape, preferably of thickness of at least 5 mm.

The resulting block is ductile even though pressed below the melting temperature. A block made of entangled polyethylene powder pressed below the melting temperature could not be skived in a subsequent step due to its brittle nature.

The film or tape skived off the block is preferably between 0.1 mm to 10 mm thick, more preferably between 1 mm and 3 mm thick. The final product obtained by the process according to the present invention may exhibit a thickness of less than 1000 μm, preferably less than 100 μm, more preferably less than 30 μm.

The total draw ratio of the film or tape is preferably at least 1:50, more preferably at least 1:100, most preferably 1:150.

Recently, there are processes developed that allow the production of non entangled or disentangled polyethylene powder with the polyethylene having a molecular weight in the range of $10^5$ to $10^7$ g/mol. This process makes use of special, sophisticated single site catalysts in addition to the right polymerisation temperature and pressure, during the polymerisation of the polyethylene powder.

A so-called disentangled or nascent polyethylene will have hardly or no entanglements of the individual chains, and therefore the crystals can be unfolded easily by drawing the material above the a-relaxation temperature of 80-90° C.

Rather than scattering very accurately a UHMWPE powder onto a continuous steel belt, the present invention is an alternative route to achieve highly drawable films by combining the pressing of disentangled polyethylene powder in thick blocks as now used for ski/snowboard surfaces, but at a much lower temperature than usual i.e. between 80° C. and 130° C. instead of the standard temperature well above 150° C., often even 180° C. or higher. In the process according to the present invention the powder is not molten, but compacted under sufficient pressure at elevated temperature, in order to avoid chain entanglements that usually occur during the melting and sintering. The produced blocks can then be skived into thin films or tapes which can than be drawn or ultra-drawn into high strength, high modulus films or tapes.

The present process is much simpler and therefore cost effective than the current processes using solvents or double belt press. The double belt press process requires a very accurate process conditions.

The skived, yet still disentangled polyethylene film produced according to the invention can preferably be drawn in a multi stage drawing step, i.e. different consecutive drawing stages and temperatures. Good results were achieved e.g. with the following steps:

$1^{st}$ draw $\lambda=6$, temperature 136-140° C.;

$2^{nd}$ draw $\lambda=4$, temperature 144-146° C.

$3^{rd}$ draw $\lambda=3$, temperature 148-150° C.;

$4^{th}$ draw $\lambda=1.8$, temperature 150-153° C.

Total draw ratio of this particular set up is 130 times the original isotropic, disentangled polyethylene film produced according to the invention, which started as a 2.5 mm thick film, skived from a block. The compression conditions were: pressure in the mould 180 bar for 10 hours at 120° C.

The first step can, rather than drawing only, also be a combined process using calendar pressure rolls plus drawing godets behind it. This way, no or very little width is lost of the film, the final result is a thinner film, which is also easier to take up the correct drawing temperature.

More drawing steps, different drawing ratios and temperatures can be used to achieve the total drawing. The initial draw can start at a temperature as low as 90° C.

Tensile strengths of this ultra drawn film above 1650 MPa and tensile moduli above 95 GPa can be achieved.

The films or tapes produced in a process according to the invention can be used in antiballistic applications as well as in composite applications, stand-alone or in combination with other materials.

The invention claimed is:

1. Process for producing high strength polyethylene films or tapes comprising the steps of providing a quantity of disentangled polyethylene, applying a pressure of at least 20 bar to the quantity of disentangled polyethylene and a temperature between an α-relaxation temperature and a melting temperature of the disentangled polyethylene ($T_{m\ PE}$) resulting in a block of disentangled polyethylene, skiving a film or tape off the block of disentangled polyethylene, and drawing said film or tape in a single or multi stage drawing step at a total draw ratio of at least 1:20.

2. Process according to claim 1, wherein the temperature for forming the block of disentangled polyethylene is between the α-relaxation temperature and $T_{m\ PE} -10°$ C.

3. Process according to claim 1, wherein the temperature for forming the block of disentangled polyethylene is between 100° C. and 130° C.

4. Process according to claim 1, wherein the high strength polyethylene films or tapes exhibit a tensile strength of at least 1200 MPa and a tensile modulus of at least 40 Gpa.

* * * * *